United States Patent [19]

Brown et al.

[11] Patent Number: 6,094,823

[45] Date of Patent: Aug. 1, 2000

[54] METHOD AND APPARATUS FOR ANCHORING FLAILS ON A STRING TRIMMER

[75] Inventors: Trever S. Brown; Darrel E. Williamson, both of Tucson, Ariz.

[73] Assignee: Jenn Feng Industrial Company, Ltd., Taiwan

[21] Appl. No.: 09/042,439

[22] Filed: Mar. 13, 1998

Related U.S. Application Data

[63] Continuation-in-part of application No. 08/899,471, Jul. 23, 1997, Pat. No. 5,987,756.

[51] Int. Cl.[7] .................................................. A01D 34/416
[52] U.S. Cl. .............................. 30/276; 30/347; 56/12.7; 56/295
[58] Field of Search ........................ 30/276, 347; 56/295, 56/12.7

[56] References Cited

U.S. PATENT DOCUMENTS

| | | | |
|---|---|---|---|
| 3,831,278 | 8/1974 | Voglesonger | 30/276 |
| 3,895,440 | 7/1975 | Pittinger, Jr. . | |
| 4,054,992 | 10/1977 | Ballas et al. | 30/276 |
| 4,054,993 | 10/1977 | Kamp et al. | 30/276 |
| 4,062,114 | 12/1977 | Luick | 30/276 |
| 4,086,700 | 5/1978 | Inada | 30/276 |
| 4,089,114 | 5/1978 | Doolittle et al. . | |
| 4,118,865 | 10/1978 | Jacyno et al. . | |
| 4,203,212 | 5/1980 | Proulx . | |
| 4,253,238 | 3/1981 | Sheldon | 30/276 |
| 4,259,782 | 4/1981 | Proulx . | |
| 4,285,127 | 8/1981 | Zerrer et al. . | |
| 4,412,382 | 11/1983 | White, III . | |
| 4,524,515 | 6/1985 | Oberg . | |
| 4,550,498 | 11/1985 | Oliver . | |
| 4,566,189 | 1/1986 | Muto . | |
| 4,656,739 | 4/1987 | Pittinger, Jr. . | |
| 4,685,279 | 8/1987 | Gullett . | |
| 4,738,085 | 4/1988 | Nishio et al. . | |
| 4,756,146 | 7/1988 | Rouse . | |
| 4,779,405 | 10/1988 | Everts . | |
| 4,790,071 | 12/1988 | Helmig et al. . | |
| 4,794,695 | 1/1989 | Hurst . | |
| 4,823,465 | 4/1989 | Collins . | |
| 4,852,258 | 8/1989 | Foster . | |
| 4,916,886 | 4/1990 | Nakamura et al. . | |
| 5,109,607 | 5/1992 | Everts . | |
| 5,136,782 | 8/1992 | Calcinai . | |
| 5,197,264 | 3/1993 | Lacey . | |
| 5,303,476 | 4/1994 | Tuggle . | |
| 5,398,416 | 3/1995 | Mackey . | |
| 5,433,006 | 7/1995 | Taguchi . | |
| 5,461,787 | 10/1995 | Araki et al. . | |
| 5,493,785 | 2/1996 | Lawrence . | |

OTHER PUBLICATIONS

Stihl, Information Sheet for "FS 44, 66, 81, 86, 96, 106, FR 106 Fixed Line Head," dated Jul., 1996.

Poulan/Weed Eater, Cover and pp. 2–5 of Twist N' Edge™ XT 35™ Operator's Manual, dated Mar. 25, 1996.

Photographs of Flymo Stringtrimmer Head and Removable Flail (date article was commercialized is unknown). This is acknowledged to be prior art with respect to the subject matter of the present invention.

Frigidaire Home Products, "Weed Eater® Operator's Manual—Cordless Clipstik™," Sep. 24, 1997. The Clipstik™ product is acknowledged to be prior art with respect to the subject matter of the present invention.

*Primary Examiner*—Hwei-Siu Payer
*Attorney, Agent, or Firm*—Banner & Witcoff, Ltd.

[57] ABSTRACT

An apparatus and method for forming a string trimmer head assembly is disclosed. The head assembly includes a head and one or more flails. Each flail includes at least one deformed portion and at least one undeformed portion and the head includes a flail holding portion adapted to mate with the deformed portion for securing the flail to the head.

13 Claims, 20 Drawing Sheets

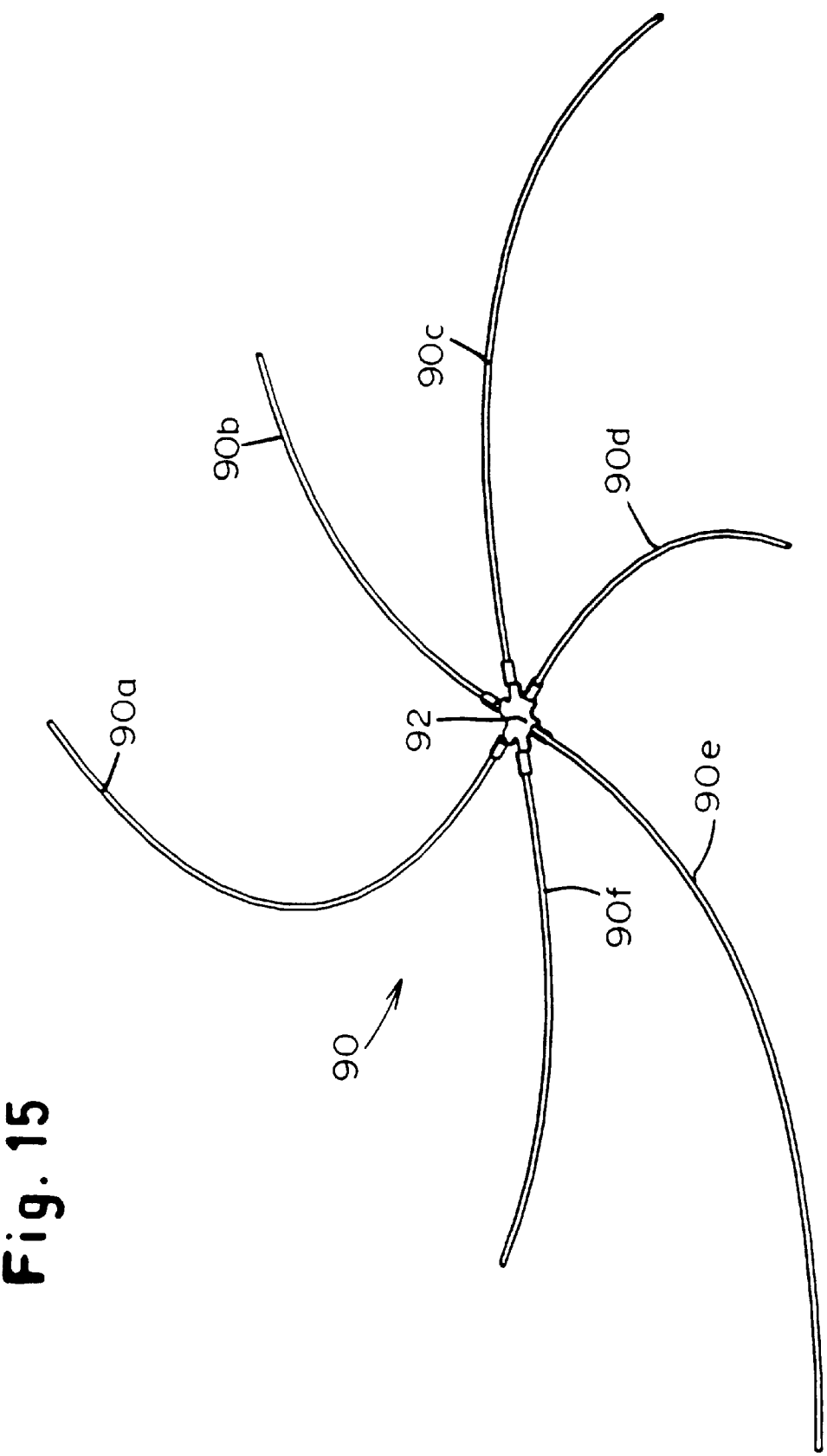

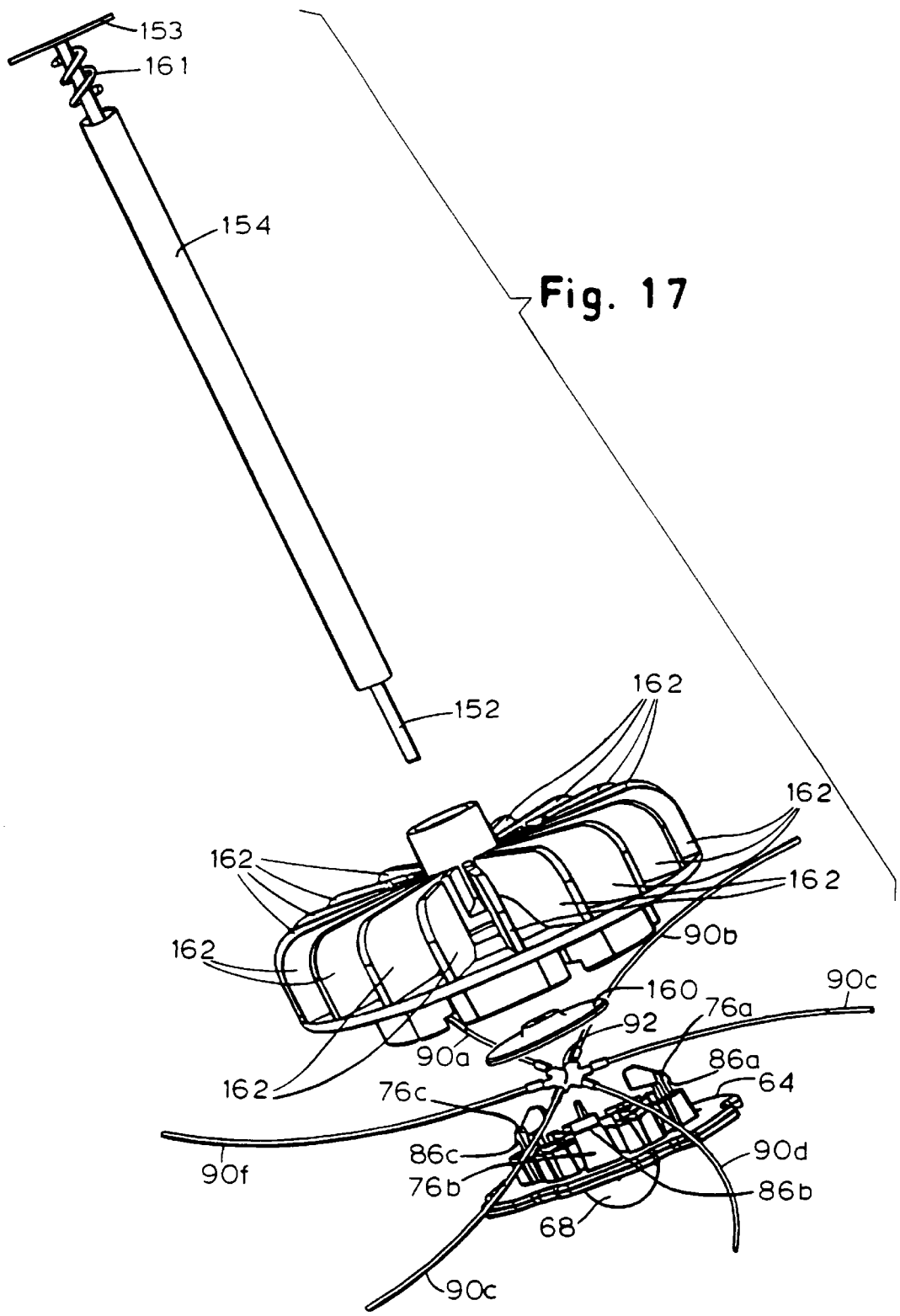

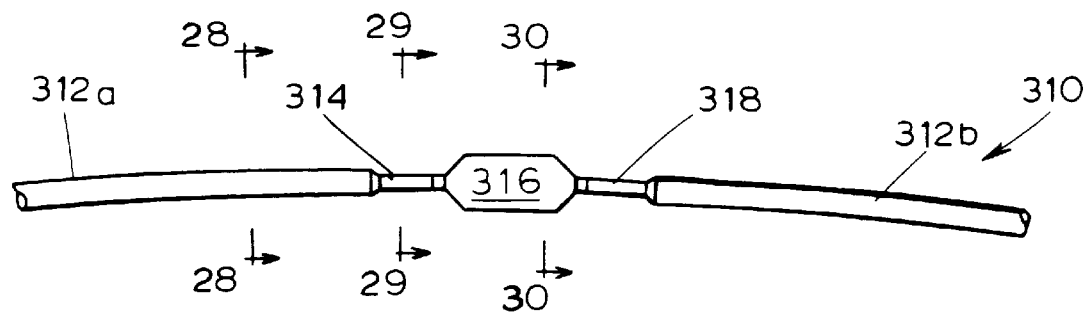
Fig. 26
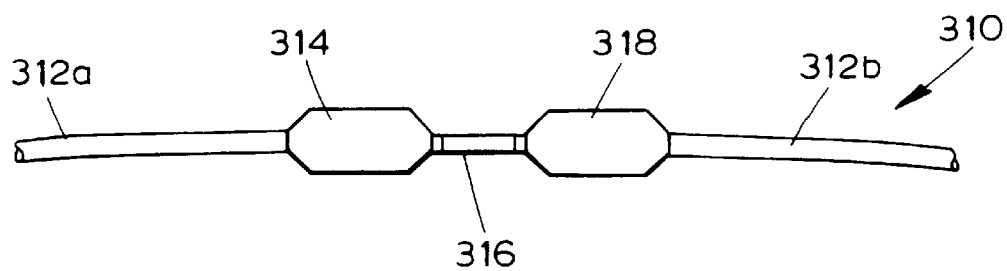
Fig. 27
Fig. 28
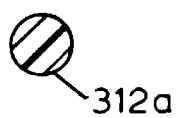
Fig. 29
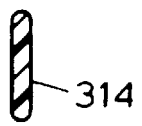
Fig. 30

METHOD AND APPARATUS FOR ANCHORING FLAILS ON A STRING TRIMMER

This is a continuation-in-part of U.S. patent application Ser. No. 08/899,471, filed on Jul. 23, 1997 now U.S. Pat. No. 5,987,756.

TECHNICAL FIELD

The present invention relates generally to lawn and garden implements, and more particularly to a head for a string trimmer.

BACKGROUND ART

String trimmers long have been used to cut vegetation, particularly in areas inaccessible by a lawn mower or other cutting device. Typically, a string trimmer utilizes one or more flexible flails, such as a string fabricated of a plastic polymer, which is retained within a head assembly. In most string trimmers, the head assembly includes a spool for storing a large quantity of flail (string) therein together with a feeding mechanism for feeding the flail into a cutting path. These feeding mechanisms may be of the bump-feed type, the inertial-feed type, or a type that utilizes an actuator that is operable to feed string when a button or lever is pushed.

Prior to the advent of feeding mechanisms, string trimmers utilized a fixed length of string, which was replaced manually once wear had occurred beyond a certain point. Because of the need to replace the flail frequently, it initially was believed that feeding mechanisms would provide a better alternative to the user, who thereby would not be faced with the inconvenience of manually replacing the string at frequent intervals. However, the stored string tends to tangle and become fouled, and in certain circumstances can become welded to itself, thereby preventing proper operation of the feeding mechanism. In addition, reloading the spool with a supply of fresh string can be a complicated process, not easily undertaken by the typical consumer. Furthermore, the single most common reason for return of string trimmers is tangled flails in the bump head.

Patents disclosing string trimmers that utilize one or more replaceable flails include Doolittle et al. U.S. Pat. No. 4,089,114, Jacyno et al. U.S. Pat. No. 4,118,865, Rouse U.S. Pat. No. 4,756,146 and Tuggle U.S. Pat. No. 5,303,476. The above-identified Doolittle et al. '114 patent further discloses the use of a disposable tip member, which snap-fits into a rotatable truncated cone member and a strand is secured within the disposable tip member.

SUMMARY OF THE INVENTION

A head for a string trimmer permits easy replacement of flails and does not suffer from the disadvantages of flail feeding mechanisms.

More particularly, a head assembly for a string trimmer comprises a hub member rotatable about an axis and a head adapted to be attached to the hub member for rotation therewith. At least one flail is secured to the head. The flail comprises at least one first portion having a first cross-sectional geometry and at least one second portion having a second cross-sectional geometry. The head comprises a flail holding portion. At least one second portion of the flail is adapted to engage the flail holding portion for securing the flail assembly to the head.

In accordance with another aspect of the present invention, a flail for a string trimmer comprises a length of string made from a polymer material. The length of string includes at least one first portion having a first cross-sectional geometry and at least one second portion having a second cross-sectional geometry.

In accordance with yet another aspect of the present invention, a method of anchoring a flail to a head assembly of a string trimmer is provided. The method comprises the steps of: providing a flail made from a length of string made from a polymer material, the length of string including at least one first portion having a first cross-sectional geometry and at least one second portion having a second cross-sectional geometry; providing a head assembly including at least one recess channel having a width that is narrower than the first portion of the flail; and inserting the second portion of the flail into the recess channel.

The present invention eliminates the difficulties encountered with flail feeding mechanisms and further provides a simple, yet effective, arrangement of parts that facilitates replacement of worn elements.

BRIEF DESCRIPTION OF THE DRAWINGS

FIG. 15 is an isometric view of a flail assembly for use with the head of FIG. 3;

FIG. 17 is a view similar to FIG. 3 illustrating an alternative embodiment of the present invention;

FIG. 26 is a plan view of an alternative flail;

FIG. 27 is a side elevational view of the flail of FIG. 26;

FIG. 28 is a cross-sectional view of the flail of FIG. 26, taken generally along lines 28—28 of FIG. 26;

FIG. 29 is a cross-sectional view of the flail of FIG. 26, taken generally along lines 29—29 of FIG. 26;

FIG. 30 is a cross-sectional view of the flail of FIG. 26, taken generally along lines 30—30 of FIG. 26;

DESCRIPTION OF THE PREFERRED EMBODIMENT

Figure 1:
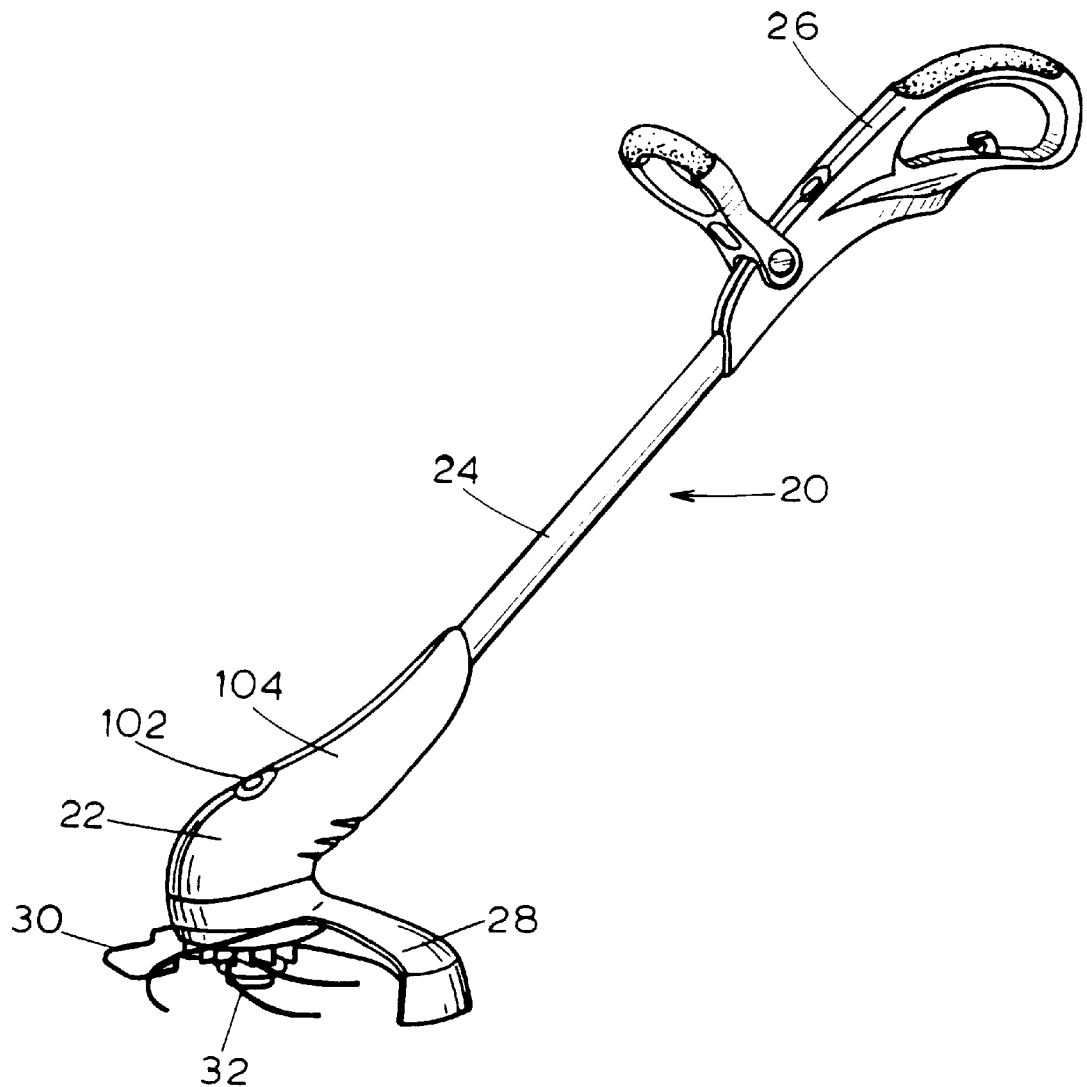
FIG. 1 comprises a perspective view of a string trimmer incorporating the present invention.

Referring first to FIG. 1, a string trimmer 20 includes a motor housing 22 disposed at a first, lower end of a boom 24 and a handle assembly 26 located at a second, upper end of the boom 24. As is conventional, a shield 28 is secured to the housing 22 and a wire guard 30 is secured to one or both of the housing 22 and the shield 28. The wire guard 30 prevents an operator from moving a head assembly 32 closer than a certain distance to an object. The wire guard 30 may also be operable in a trimmer mode to serve as a guide.

Figure 2:
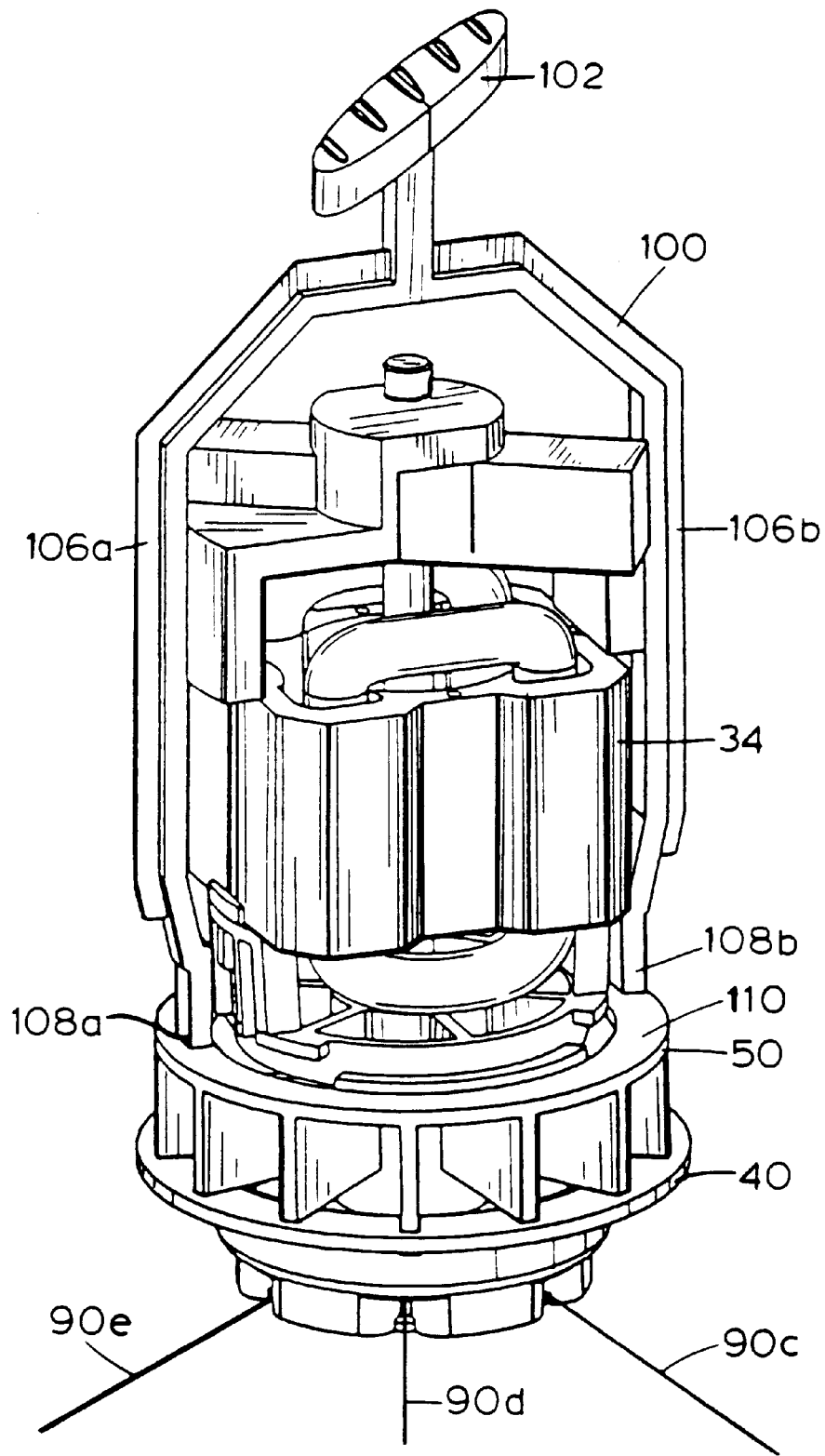
FIG. 2 is an isometric view of a motor in conjunction with a release mechanism for releasing the head from the hub of the string trimmer.
Figure 3:
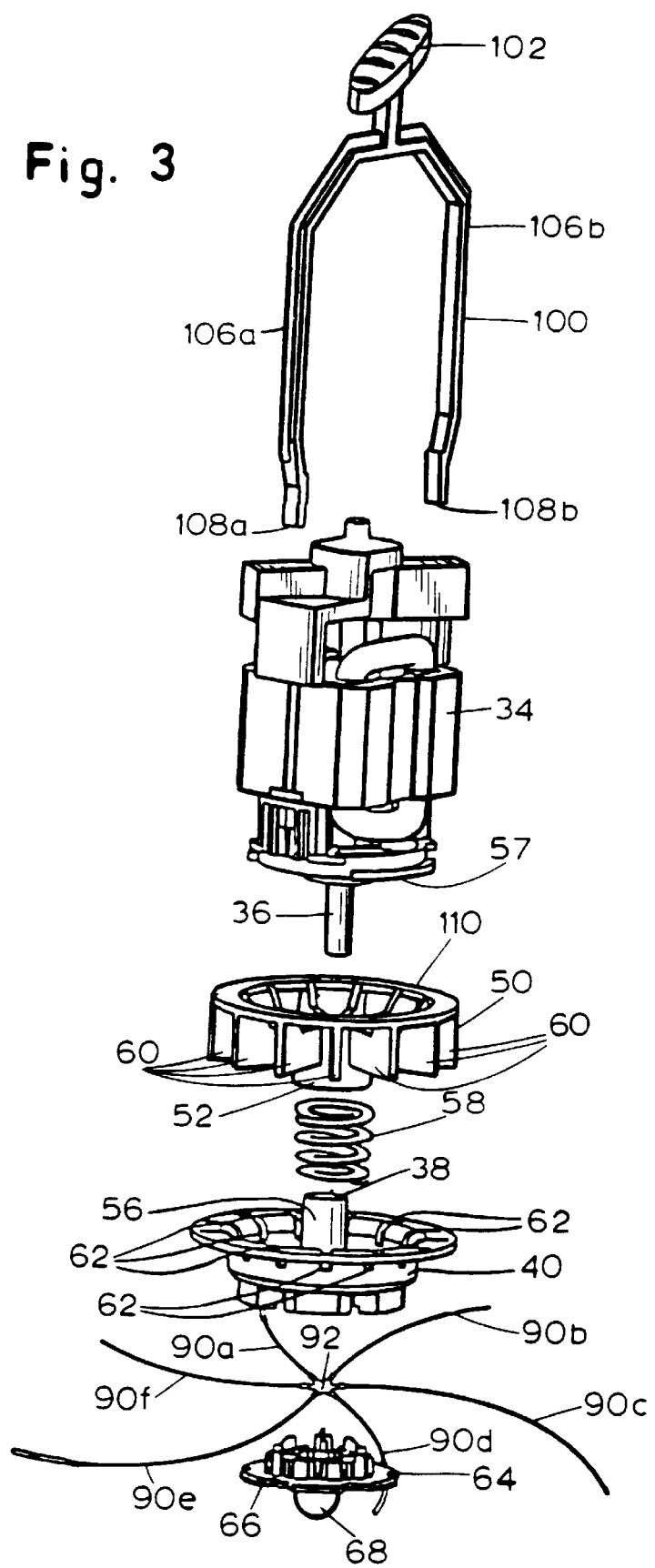
FIG. 3 is an exploded trimetric view of the elements of FIG. 2.
Figure 8:
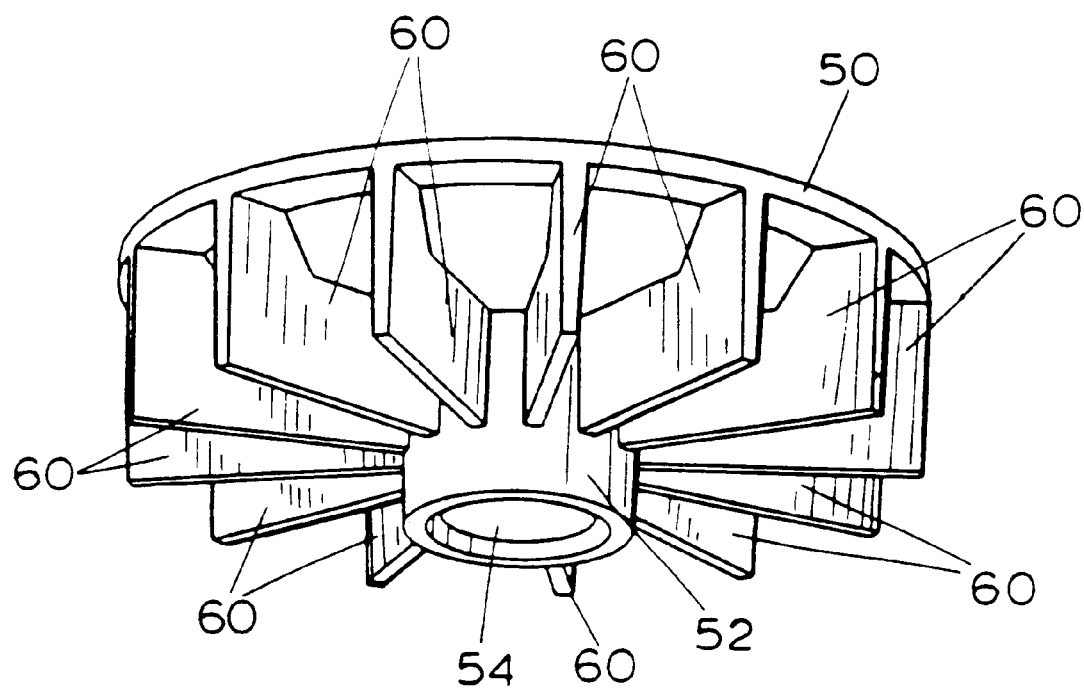
FIG. 8 is a trimetric view, taken from below, of the upper hub element of FIG. 3.
Figure 9:
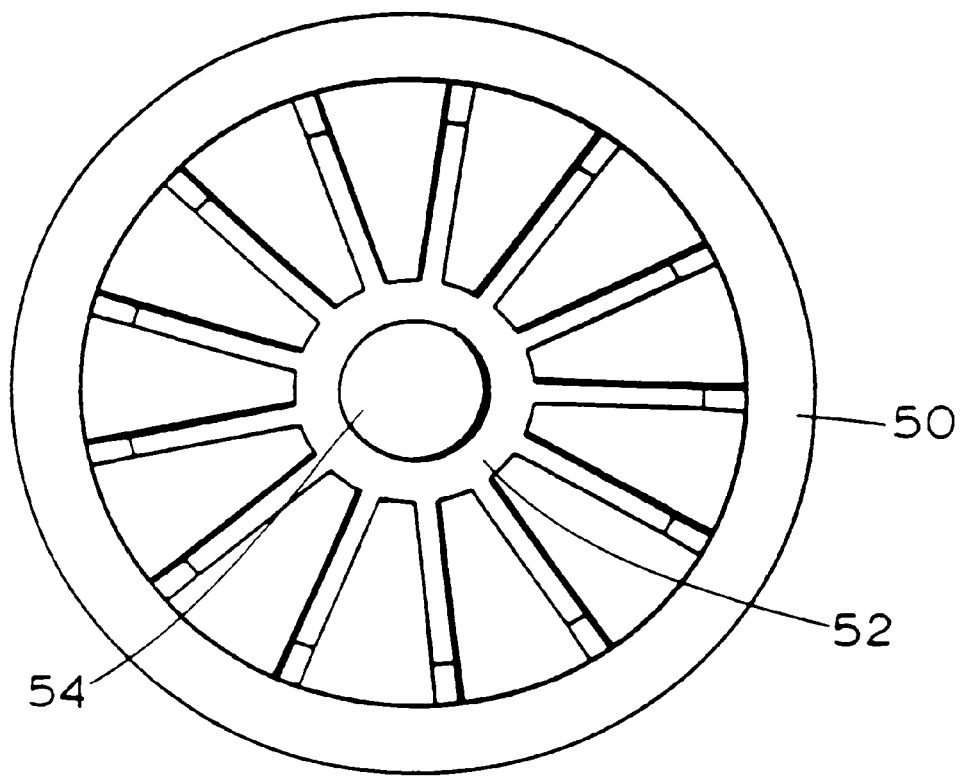
FIGS. 9 and 10 are plan and side elevational views, respectively, of the upper hub element of FIG. 8.
Figure 10:
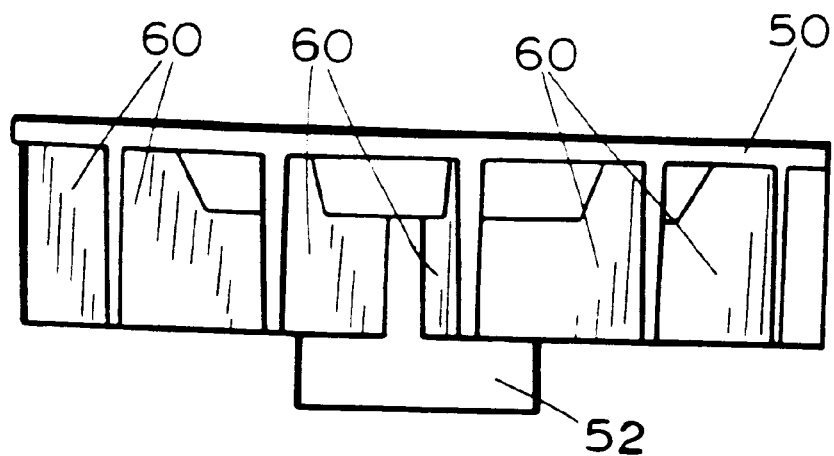
Figure 14:
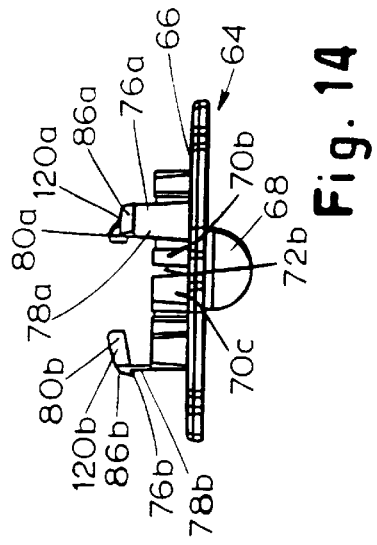
FIGS. 13 and 14 are side elevational views taken generally along the lines 13—13 and 14—14, respectively, of FIG. 12.
Figure 11:
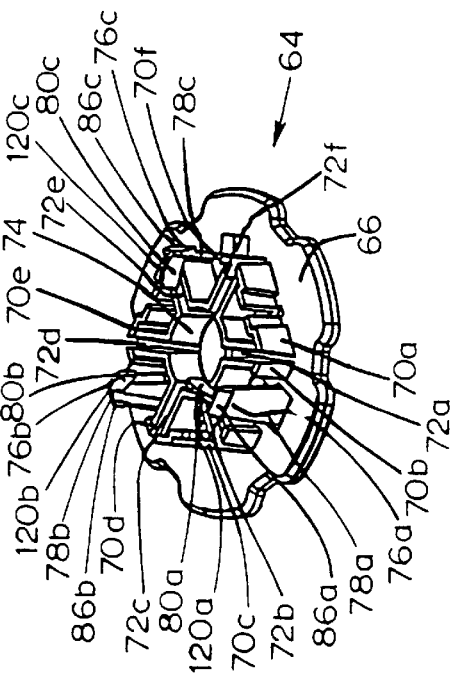
FIG. 11 is an isometric view of the head of FIG. 3 in a first orientation.

Referring also to FIGS. 2 and 3, a motor 34 is disposed within the housing 22 and is connected to electrical conductors (not shown) extending from the handle assembly 26 through the boom 24 and into the housing 22. The electrical conductors may be connected to a source of power to energize the motor 34, as is conventional. In a first embodiment of the present invention as illustrated in FIGS. 2 and 3, a motor shaft 36 of the motor 34 is secured by any suitable means within a bore 38 of a lower hub member or element 40 so that the element 40 is fixed to and rotates with the shaft 36 (the element 40 is seen in greater detail in FIGS. 4–7). An upper hub element 50 (shown in greater detail in FIGS. 8–10) includes a central cylindrical portion 52 having a bore 54 (FIGS. 8 and 9) within which is slidingly received a central hollow boss portion 56 of the lower hub element 40 such that the upper hub element 50 is captured between an end bell 57 of the motor 34 and the lower hub element 40.

Axial movement of the upper hub element 50 can occur relative to the lower hub element 40, during which time the boss portion 56 slides within the bore 54.

A spring 58 disposed between the upper and lower hub elements 40, 50 biases the upper hub element 50 upwardly toward the motor 34 relative to the lower hub element 40.

The upper hub element 50 includes a plurality of fan blades 60 which provide air movement for cooling of the motor 34. The fan blades 60 slidably engage slots 62 of the lower hub element 40 permitting axial travel of upper hub element 50 while causing the upper hub element 50 to rotate with the lower hub element 40 and the motor shaft 36.

Figure 4:
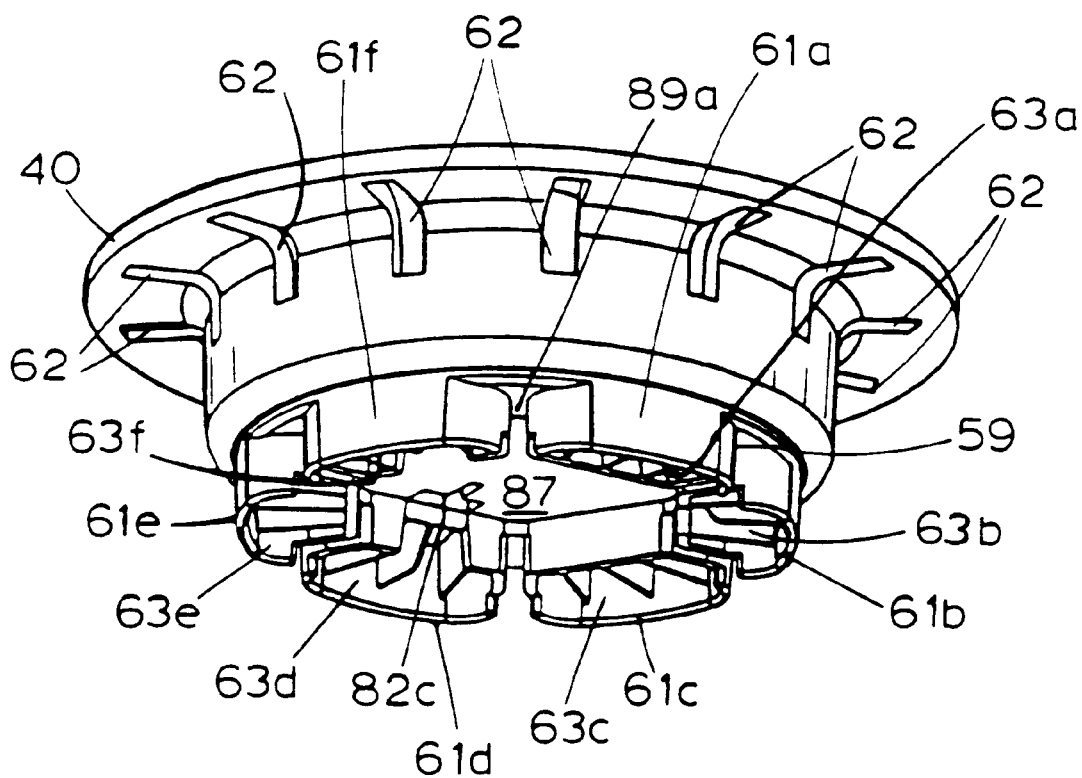
FIG. 4 is a trimetric view taken from below the lower hub element of FIG. 3.
Figure 7:
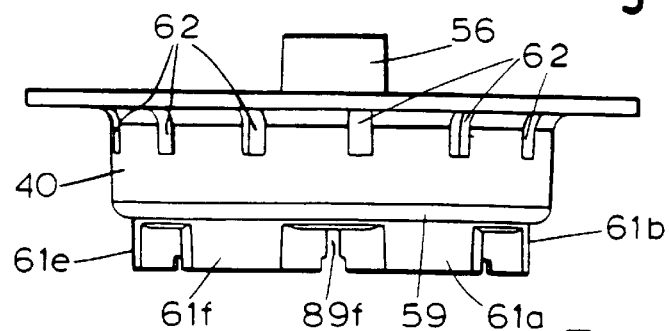
Figure 6:
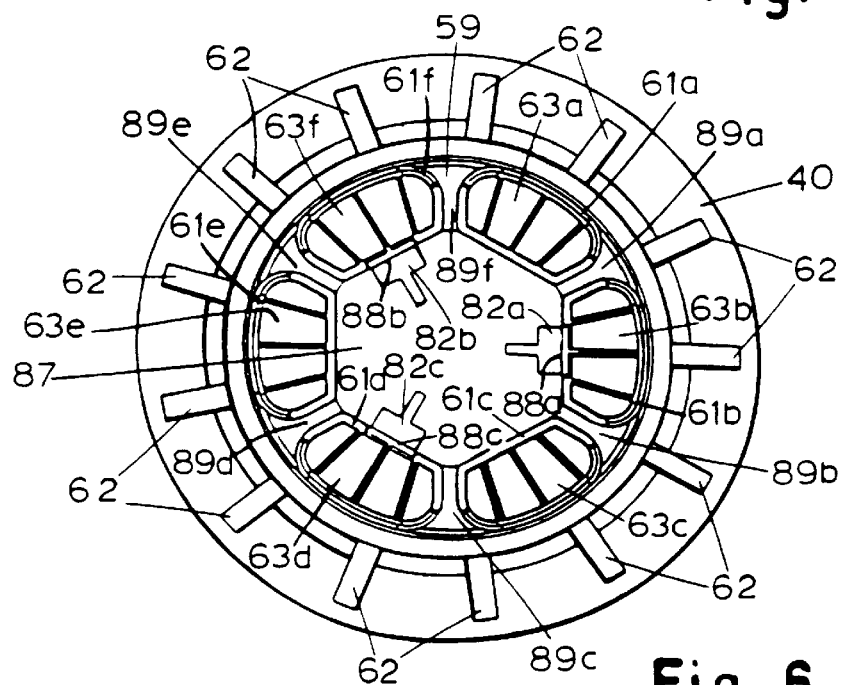

As seen in FIGS. 4, 6 and 7, the lower hub element 40 includes a lower main surface 59 from which walls 61a–61f extend to define open chambers or recesses 63a–63f.

With reference also to FIGS. 11–14, a head 64 includes a base surface 66 which may be generally planar and a curved lower member 68. The member 68 is provided to space the head 64 above the ground during operation. The head 64 further includes a plurality of upraised wall portions or sections 70a–70f, each of which is roughly triangular in shape and which together define a plurality of recess channels 72a–72f extending outwardly from a recess center portion 74. First through third mounting arms 76a–76c are carried by and extend away from the base surface 66. If desired, each of the arms 76a–76c may instead be carried by a corresponding wall portion 70b, 70d, 70f, respectively. In any event, each arm 76a–76c includes a deflectable main portion 78a–78c, respectively, and an inwardly directed finger portion 80a–80c, respectively.

Figure 5:
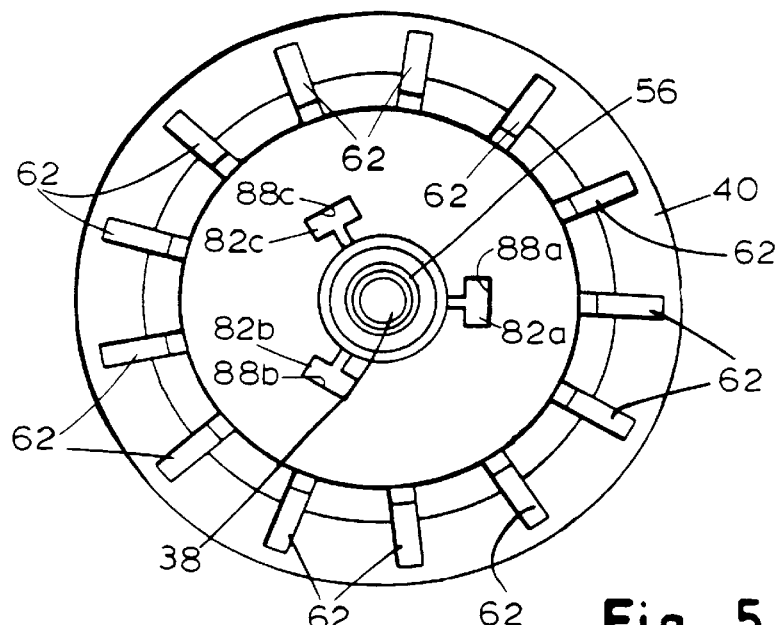
FIGS. 5–7 are plan, lower elevational and side elevational views, respectively, of the lower hub element of FIG. 4.

When the head 64 is mounted on the lower hub element 40, the finger portions 80a–80c extend into apertures 82a–82c (FIGS. 4–6), such that hooked portions 86a–86c (best seen in FIGS. 11, 13, and 14) engage outer margins 88a–88c of the apertures 82a–82c, respectively (the outer margins 88a–88c are best seen in FIGS. 5 and 6). Also, when the head 64 is secured to the lower hub element 40, the wall portions 70a–70f fit within a recess center portion 87 of the lower hub element 40 and the recess channels 72a–72f are radially aligned with recess channels 89a–89f located between adjacent walls 61a–61f (see FIGS. 4, 6 and 7). The recess center portion 87 is defined by the walls 61a–61f.

It should be noted that each of the finger portions 80a–80c may extend into any of the apertures 82a–82c (i.e., the arms 76a–76c and the apertures 82a–82c are symmetric and hence may be aligned in any of three positions to fit the head 64 onto the lower hub element 40.)

Figure 24:
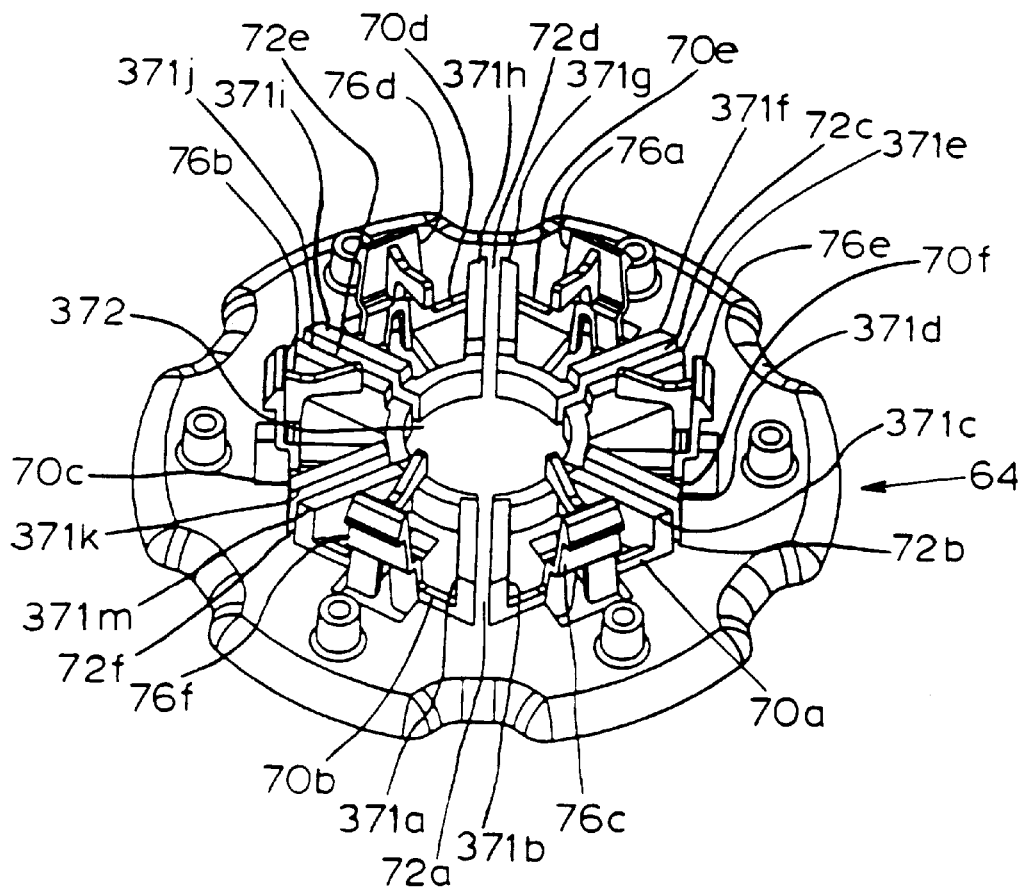
FIG. 24 is an isometric view of another embodiment of the head.
Figure 25:
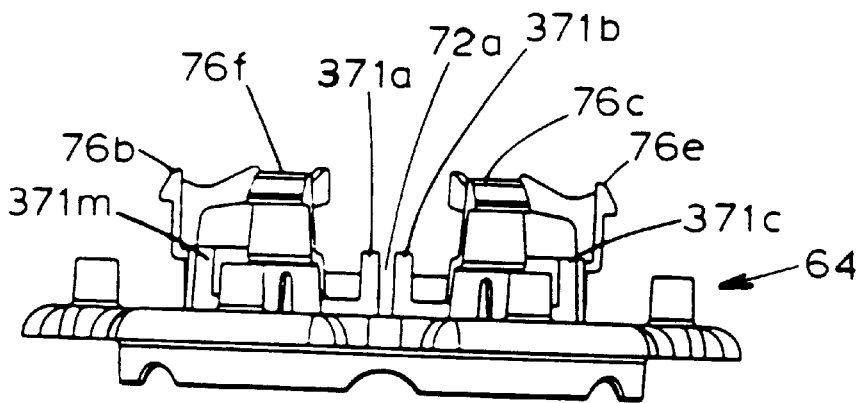
FIG. 25 is a side elevational view of the head of FIG. 24.

If desired, three additional arms 76d–76f can be provided for a total of six arms instead of only the three arms 76a–76c. Such an arrangement is shown in FIGS. 24 and 25 in connection with another embodiment of the head 64, discussed in further detail below.

Figure 16:
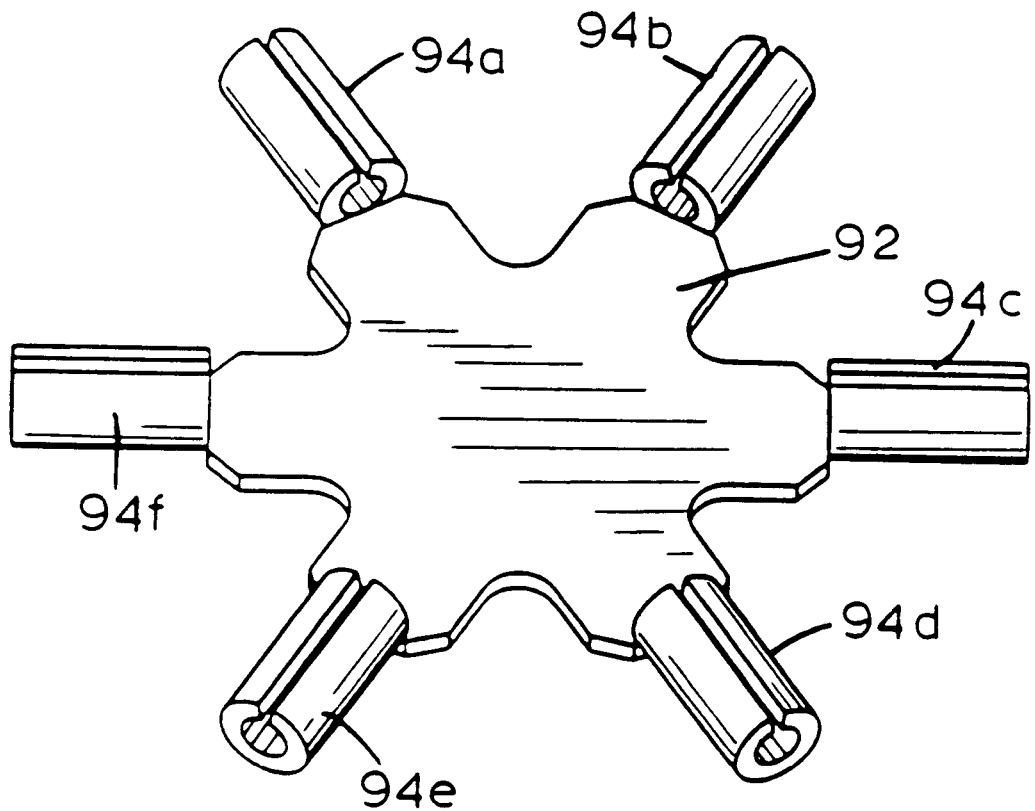
FIG. 16 is an enlarged trimetric view of the connection member of FIG. 15.

FIG. 15 illustrates a flail assembly 90 which may be inserted into the recess channels 72a–72f and the recess center portion 74 prior to assembly of the head 64 on the lower hub element 40. The flail assembly 90 includes a plurality of flails 90a–90f which are secured to a central connection member or carrier 92. As seen in FIG. 16, the carrier 92 includes a plurality of flail receptacles 94a–94f in the form of ferrule members or portions which are crimped onto the flails 90a–90f, respectively, using any appropriate crimping tool. The carrier 92 may be fabricated of metal or any other suitable inexpensive material. If desired, the carrier 92 may have a different shape and/or accommodate a different number of flails.

Once the flail assembly 90 is assembled with the head 64 and the lower hub element 40, the carrier 92 is captured within one or both of the recess center portions 74, 87 and the flails extend radially outwardly through the aligned recess channels 72a–72f and 89a–89f.

Figure 20:
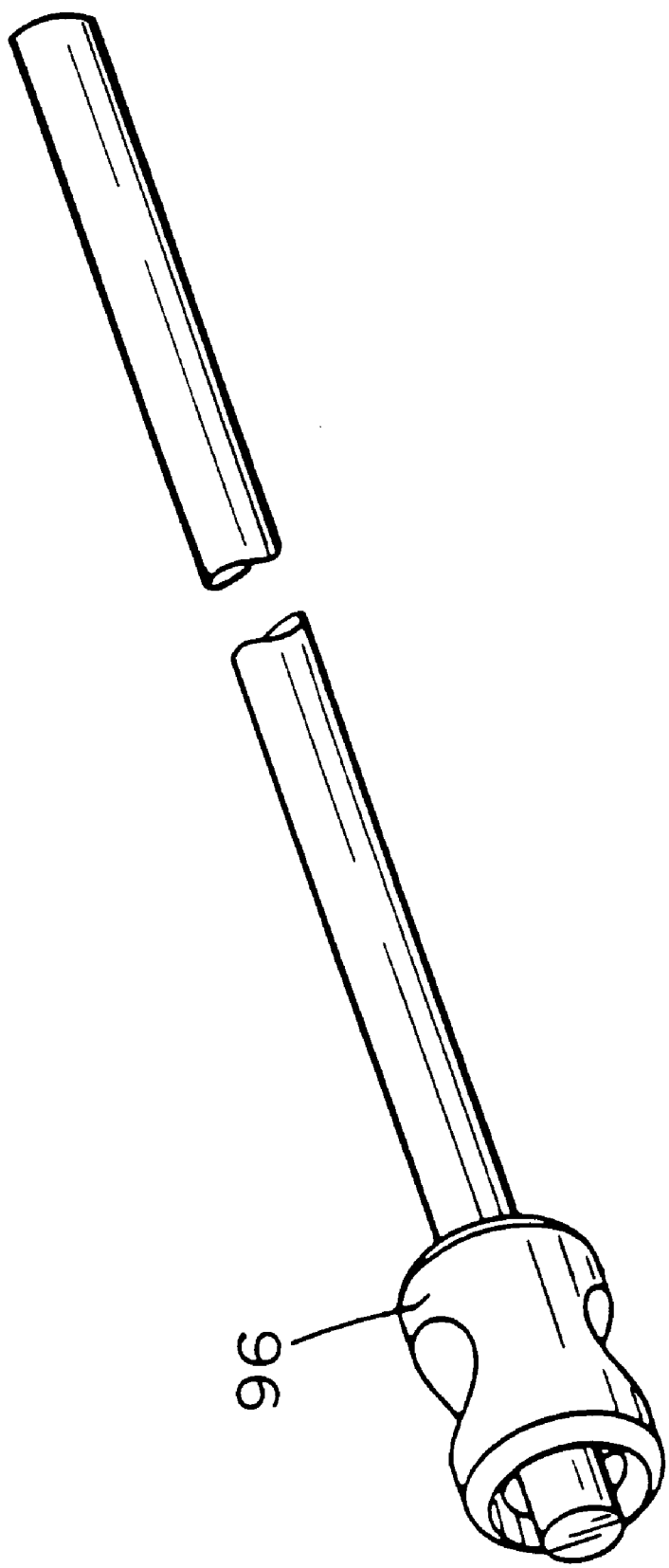
FIG. 20 is an isometric view of a single ferrule and flail for use in an alternative embodiment of the present invention.

Rather than simply placing the carrier 92 with attached flails 90a–90f in the recess center portion 74, the carrier 92 may instead be secured to the head 64 inside the portion 74 by any suitable means, such as by heat staking, adhesive, etc. As a further alternative, the single carrier 92 can be replaced by a plurality of individual separate ferrules 96 (one of which is shown in FIG. 20), each of which is crimped to one of the flails 90a–90f, and which has a cross-sectional dimension larger than the cross-sectional dimension of the recess channels 72a–72f. Each ferrule 96 may comprise a simple hollow tube or may be split axially and thus have a C-shape in cross-section. In the latter case, a relatively uniform compressive load can be applied over the length of the ferrule 96 during the crimping process so that localized high stress on and weakening of the flail can be avoided. The individual ferrules 96 are placed in the recess center portion 74 with the flails extending outwardly through the aligned channels 72a–72f and 89a–89f. The ferrules 96 may be secured to the head by any suitable means (heat staking, adhesive, etc.), if desired. During rotation of the head 64, the ferrules prevent outward ejection of the flails 90a–90f owing to the difference in cross-sectional sizes of the ferrules and the channels 72a–72f.

Crimping the flails to the carrier 92 or the individual ferrules 96 precludes the need to apply localized heat to the flails to secure the flails to the head 64, the carrier 92 or the ferrules 96, thereby avoiding heat induced local weakening and premature failure of the flails.

Referring again to FIGS. 1, 2 and 3, an eject linkage 100 includes a button 102 which is accessible from a top surface 104 of the housing 22, and thus is remote from the head 64. First and second arms 106a, 106b slide in channels (not shown) or are otherwise guided by features in the housing 22 and include lower ends 108a, 108b which can be made to contact an upper flange surface 110 of the upper hub element 50. If desired, integral spring elements of the eject linkage 100 may bear against features (not shown) internal to the housing to bias the button 102 upwardly such that the lower ends 108a, 108b of the arms 106a, 106b are spaced from the upper hub element 50 when no pressure is applied to the button 102.

When it is desired to replace a worn flail assembly, an operator may press on the button 102, thereby displacing the linkage 100 downwardly to contact and then displace the upper hub element 50. During such displacement, the fan blades 60 are able to slide through the slots 62 of the lower hub element 40 to permit such movement. The center portion 52 of the upper hub element 50 ultimately bears against upper cam surfaces 120a–120c (FIGS. 11–14) of the finger portions 80a–80c of head 64 and causes the arms 76a–76c to deflect inwardly, thereby disengaging the hooked portions 86a–86c from the outer margins 88a–88c of the apertures 82a–82c. The head 64 then either may be ejected by further movement of upper hub elements 50 and/or may drop downwardly under the force of gravity from the lower hub element 40 to permit access to the flail assembly 90. Once the worn flail assembly has been replaced with a new flail assembly, the head 64 can be reinstalled on the lower hub element 40 in the manner previously described.

In those cases in which the flail carrier 92 is secured to the head 64, the head 64 and attached flail assembly 90 are replaced together as a unit. Preferably, the head 64 and flail assembly 90 are fabricated of inexpensive materials so that cost is minimized.

Because the hooked portions 86a–86c are biased outwardly into contact with the outer margins 88a–88c, the head 64 is positively retained on the lower hub member 40, and this positive retention is enhanced during operation of the string trimmer 20 owing to an increase of the latching forces by centrifugal forces acting on the arms 76a–76c.

As should be evident from an inspection of FIG. 15, the lengths of all of the flails need not be equal. In fact, for example, the flails 90b, 90d and 90f may be of a first length and the remaining flails 90a, 90c and 90e may be of a second length longer than the first. It is thought that by making the flail lengths unequal, cutting efficiency can be maximized over the total life of the flails. Specifically, before wear has occurred, the majority of the cutting is accomplished at the tips of the longer flails, which are moving at a relatively high linear speed. As wear occurs, the flails shorten, thereby decreasing linear tip speed. Eventually, the longer flails wear to the length of the shorter flails, thereby presenting a greater number of flail tips for cutting, at least in part compensating for the shorter flail length and consequent lower tip speed.

Preferably, the long and short flail lengths form a pattern which is symmetric with respect to the rotational axis of the head so that an unbalanced situation is avoided.

Figure 18A:
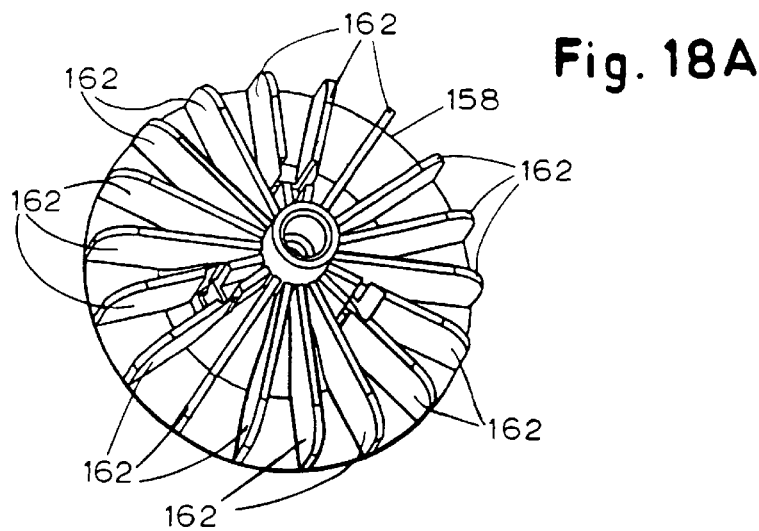
FIGS. 18a–18c are top trimetric, bottom trimetric and bottom elevational views, respectively, of the hub member of FIG. 17.
Figure 18B:
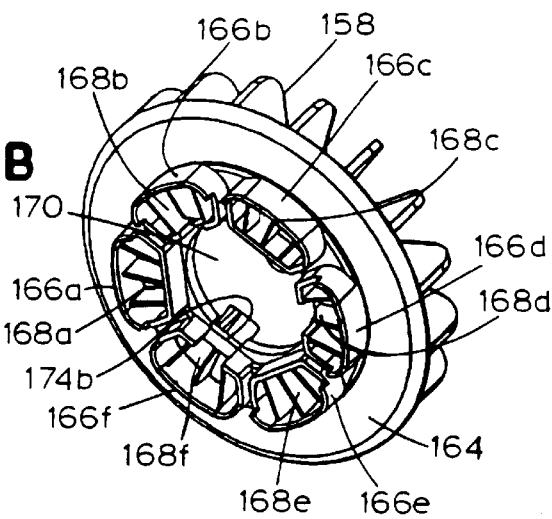
Figure 18C:
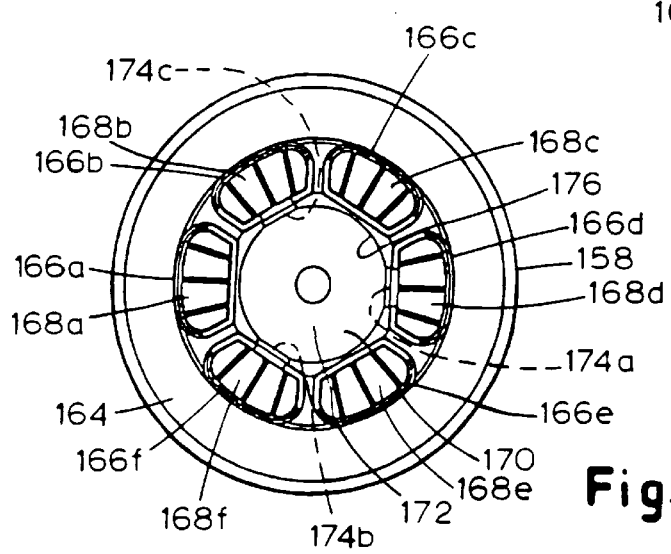
Figure 19:
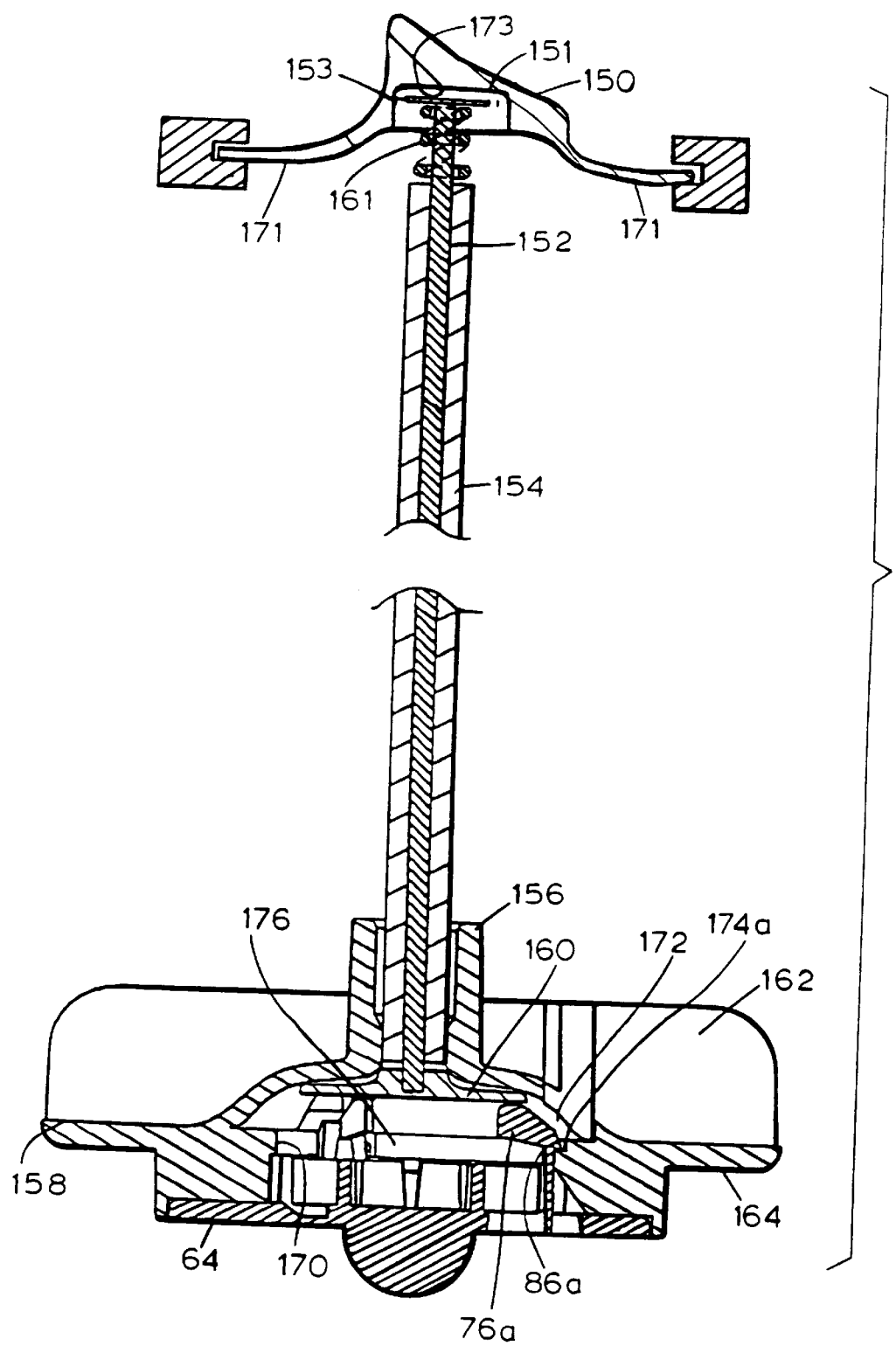
FIG. 19 is a fragmentary sectional view of a portion of the embodiment illustrated in FIG. 17.

FIGS. 17–19 illustrate another embodiment of the present invention, which may utilize the head 64 and the flail assembly 90 of the previous Figs. In this embodiment, a button 150 having a button recess 151 is actuable from the top surface of the housing 22 (FIG. 1) and is engageable with an eject linkage in the form of an ejection pin 152 having a spring plate 153 welded or otherwise secured thereto. The spring plate 153 resides within the button recess 151. The ejection pin 152 extends through a hollow motor shaft 154 and a hollow axle 156 of a hub member 158 into an ejector member 160. The hollow motor shaft 154 is rigidly fixed to the hollow axle 156 by any suitable means such that the hub member 158 rotates together with the shaft 154. The ejection pin 152 is spring loaded by a spring 161 disposed between the spring plate 153 and an end of the motor shaft 154 and the ejector member 160 is fixed to the end of the ejection pin 152 and is moveable therewith. As seen in FIG. 19, the hub member 158 includes fan blades 162 and a lower main surface 164 from which walls 166a–166f extend defining chambers 168a–168f, respectively, similar or identical to the walls 61a–61f and chambers 63a–63f of FIGS. 4 and 6. A central aperture 170 located between the walls 166 extends through the base surface 164 into a cavity 172 in which the ejector member 160 is disposed.

The button 150 includes one or more integral spring elements 171 (FIG. 19) which engage structures or other features (such as grooves in ribs) in the housing 22 to bias the button 150 upwardly and thus normally space a base surface 173 of the button recess 151 from the spring plate 153 when no force is applied to the button 150.

Figure 12:
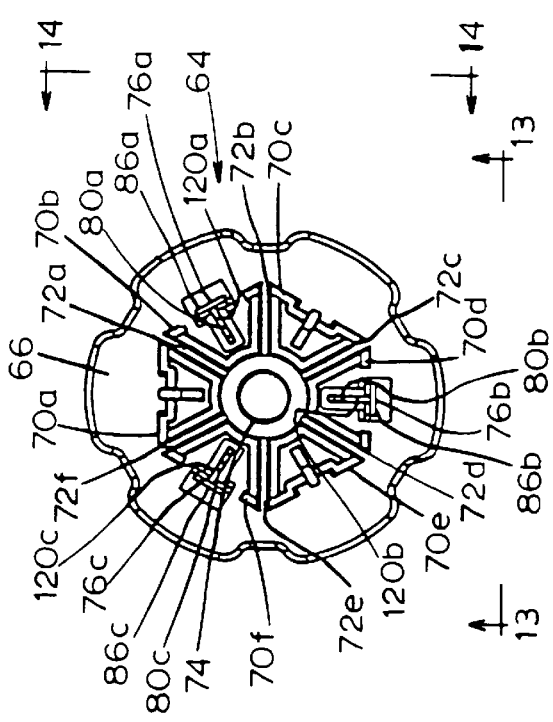
FIG. 12 is a plan view of the head of FIG. 11 in a second orientation which is rotated with respect to the first orientation.
Figure 13:
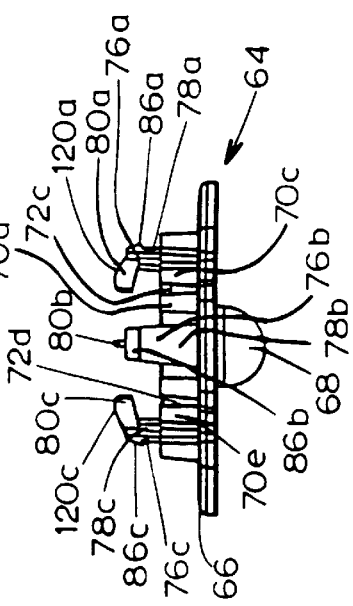

As in the previous embodiment, the head 64 is prepared for installation by placing a flail assembly 90 in the channels 72a–72f and recess chamber 74 (FIG. 12). The head 64 then is assembled onto the hub member 158 by passing the arms 76a–76c into the central aperture until the hooked portions 86a–86c engage undercut channels 174a–174c formed in a wall 176 defining the periphery of the aperture 170 (see FIGS. 18a–18c). At this time, the ejector member 160 is positioned between the hub element 158 and the head 64, as seen in FIG. 19. The head 64 is keyed against rotation by fitting of the outer periphery of the head 64 with the outer portions of the walls 166a–166f and by seating of the hooked portions 86a–86c with the undercut channels 174a–174c (the channels 174a–174c have a limited angular extent, as seen in FIGS. 18b and 18c). Ejection of the head 64 from the hub element 158 is accomplished by downwardly displacing the button 150 and the ejection pin 152 against the bias provided by the spring elements 171 and the spring 161, in turn, displacing the ejector member 160 into engagement with the finger portions 80a–80c. Continued downward displacement of the ejector member 160 via the button 150 and the ejection pin 152 causes the arms 76a–76c to deflect inwardly in the manner described previously, disengaging the hooked portions 86a–86c from the undercut channels 174a–174c. The head 64 thus is free to move away from the hub member 158, whether under the force of gravity, continued force applied by the ejector member 160, or both. The head 64 then may be reloaded with a new flail assembly 90 and reassembled onto the hub member 158 in the manner previously described.

If desired, the flail assembly 90 can be configured to include arms like the arms 76 so that the assembly 90 itself may be removably retained on the hub member 40 or 158 without the need for the head 64.

Also, if desired, the flails 90a–90f may instead be permanently attached directly to the head 64 itself by any suitable means, such as heat staking, ultrasonic welding, adhesive, etc.

The number of individual flails used may vary, and, in fact, one or more flails may extend outwardly from opposite sides of the head 64, if desired. Regardless of the attachment of the flails, such attachment can be accomplished using highly automated, rapid operations.

In addition to the foregoing, by utilizing different ejector linkages, the button 102 or 150 may be located in a different position, allowing the actuating force for the release mechanism to be applied in a different direction.

Figure 21:
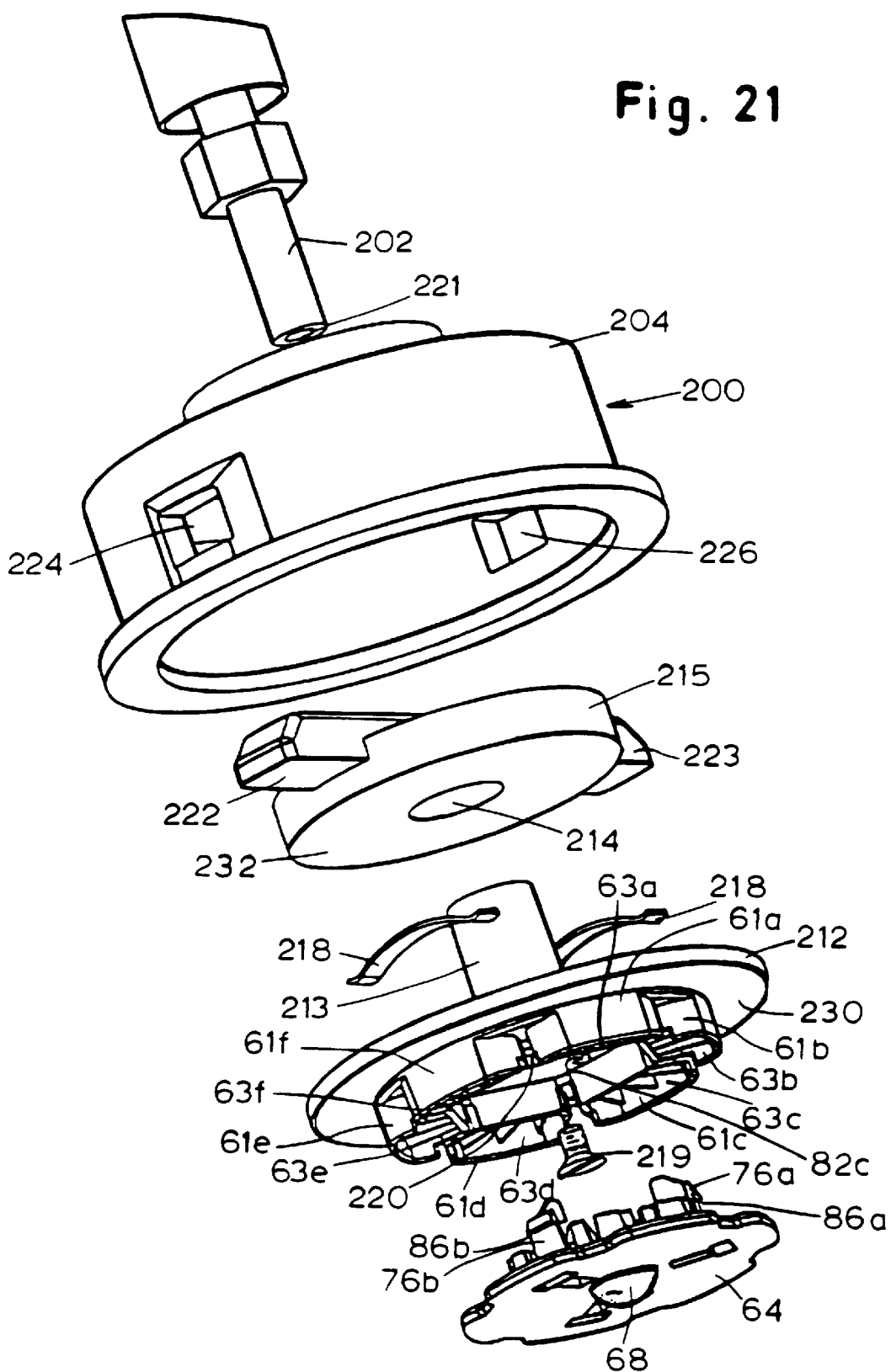
FIG. 21 is a trimetric view of a further embodiment of the present invention.
Figure 22:
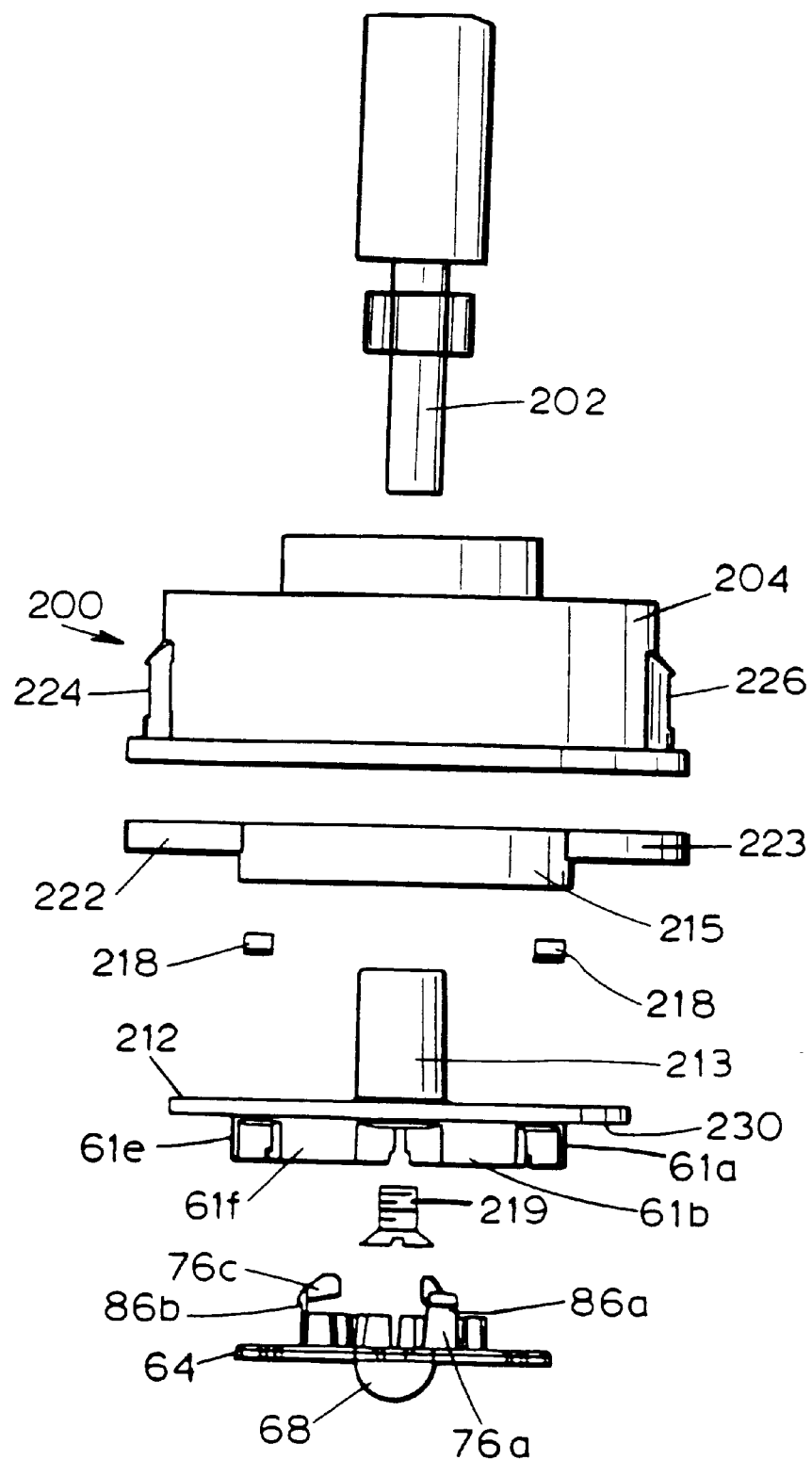
FIG. 22 is an exploded side elevational view of the embodiment of FIG. 21.
Figure 23:
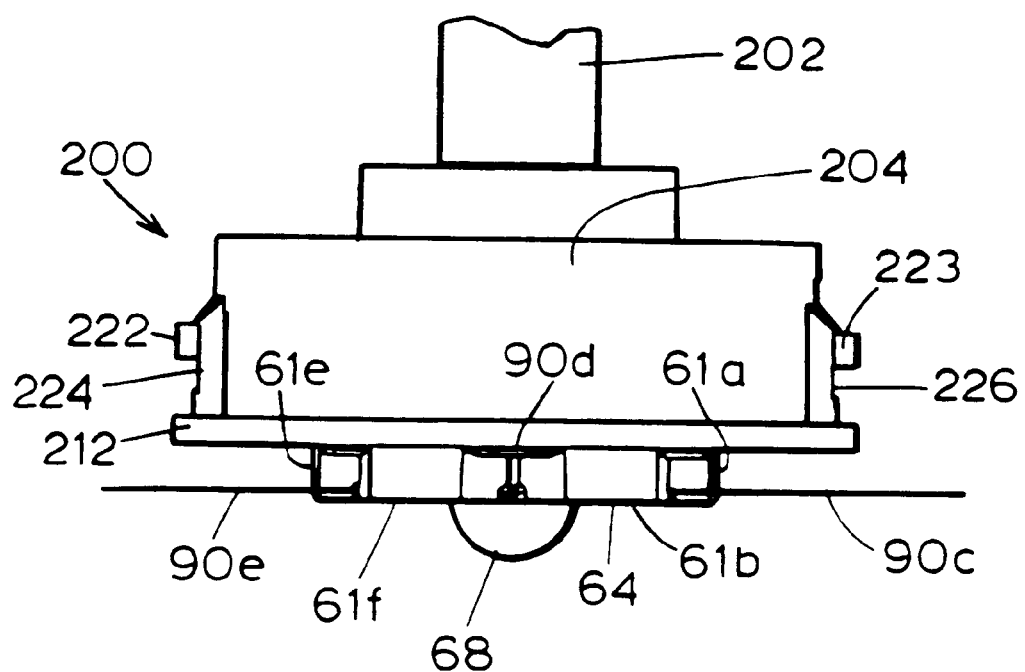
FIG. 23 is a fragmentary side elevational view of the assembled components of FIG. 21.

FIGS. 21–23 illustrate another embodiment of the present invention, in which a conventional head 200 incorporating a bump-feed mechanism and used, for example, on a string trimmer powered by a motive power source (such as a gas engine or an electric motor) disposed at an upper end of the string trimmer, is retrofitted to utilize one or more disposable components (such as the head 64) according to the present invention. The motive power source is connected through a drive cable or other drive mechanism 202 to the head 200. The head 200 includes a main hub element or member 204 mounted for rotation on the drive cable 202 and from which the usual bump feed components (such as a spool, spring and a ground engaging member) have been removed. The head may be that found on string trimmer Model No. MAC2816, manufactured by McCulloch North America, Inc. (formerly known as McCulloch Corporation), of Tucson, Ariz. An auxiliary hub element or member 212 includes a cylindrical central boss 213 which extends through a central cylindrical bore 214 of a release mechanism in the form of an ejector element or member 215. The central boss 213 is slightly smaller than the bore 214 so that the ejector element can move axially relative to the auxiliary hub member 212. One or more leaf springs 218 are captured between the auxiliary hub member 212 and the ejector member 215 and are retained in position by any suitable means. A flat head screw 219 extends through a central bore 220 of the auxiliary hub member 212 (the bore 220 is centered within and extends fully through the central boss 213) and the bore 214 of the ejector member 215 and is threaded into a threaded bore 221 in the drive shaft 202. The screw 219 includes an enlarged head which captures the members 212, 215 on the drive shaft 202 for rotation therewith. As seen specifically in FIG. 23, first and second ears 222, 223 extend through diametrically opposite apertures 224, 226, respectively, in the main hub member 204. The ears 222, 223, and thus the ejector member 215, are axially movable a short distance in the apertures 224, 226. During such movement, the ejector member 215 is guided on the auxiliary hub member 212 owing to the fit of the central boss 213 in the bore 214.

If desired, the auxiliary hub member 212 and the main hub member 204 may have interengaging features to cause the two members to rotate together during operation.

The auxiliary hub member 212 includes a lower main surface 230, identical to the lower main surface 59, from which the walls 61a–61f extend to define the recesses 63a–63f. The apertures 82a–82c described previously also extend through the surface 230.

As in the previous embodiments, when the head 64 is mounted on the auxiliary hub member 212, the hooked portions 86a–86c of the arms 76a–76c engage the outer margins 88a–88c of the apertures 82a–82c in the auxiliary hub member 212. When the ears 222, 223, and thus the ejector member 215, are downwardly axially displaced against the bias provided by the leaf springs 218, a lower surface 232 of the ejector member 215 contacts the arms 76a–76c, thereby moving such arms inwardly and releasing the hooked portions 86a–86c from the outer margins 88a–88c of the apertures 82a–82c and releasing the head 64 from the auxiliary hub member 212. A new flail assembly 90 may then be placed in the head 64 and the head 64 may be reassembled on the auxiliary hub member 212 as described above.

As shown in FIGS. 26 through 30, in accordance with another embodiment of the invention, a flail 310 comprises two flail cutting portions 312a and 312b, each having a width $W_1$, and spaced from one another by first, second and third integral deformed portions 314, 316 and 318, respectively (FIGS. 26 and 27) each having a width $W_2$ less than the width $W_1$ of the flail cutting portions 312A and 312B. The flail 310 is formed from a single piece of string of polymer material, preferably an extruded Nylon copolymer.

Also preferably, each of the flail cutting portions 312a and 312b has a substantially circular cross-sectional geometry, as seen in FIG. 28, although any other suitable cross-sectional geometry could be used. Further, the first and third deformed portions 314 and 318 are formed by crimping or otherwise deforming the string using a press or other suitable apparatus, so that the first and third deformed portions 314 and 318 are both flattened into substantially coplanar shapes (FIGS. 27 and 29). Similarly, the second deformed portion 316 is obtained by crimping or otherwise deforming the string in the same fashion so that the second deformed portion 316 has a shape (seen in FIGS. 27 and 30) which is substantially normal to the substantially coplanar slopes of the portions 314 and 318. The first and third deformed portions 314 and 318 are sized and spaced apart from one another so that they fit into diametrically opposed pairs of the recess channels 72a–72f. Specifically, as seen in FIGS. 24 and 25, the head 64 may be initially molded or otherwise produced with twelve upraised flanges 371a–371m, each extending away from the upraised wall portions or sections 70a–70f.

Figure 31:
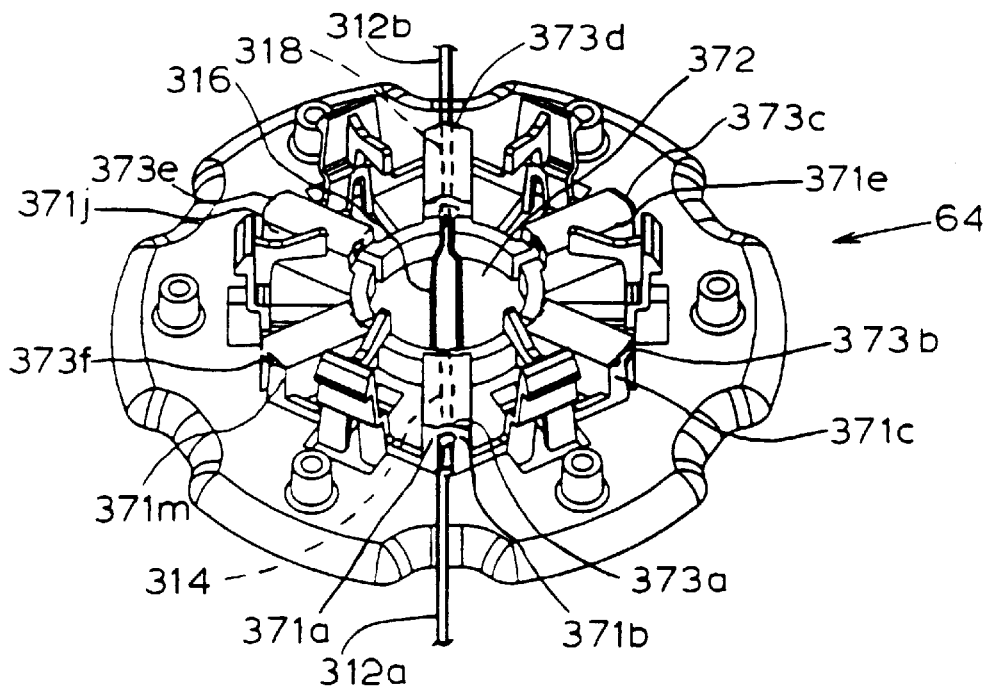
FIG. 31 is a view similar to FIG. 24 showing the head of FIG. 24 with one of the flails of FIG. 26 secured to the head.
Figure 32:
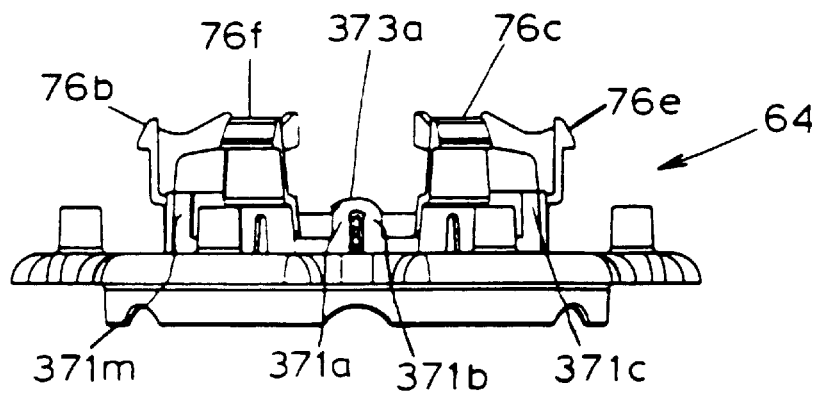
FIG. 32 is a view similar to FIG. 25 showing the head of FIG. 24 with one of the flails of FIG. 26 secured to the head.

The flanges 371a, 371b form an associated pair and are located on either side of the recess channel 72a. In similar fashion the recess channels 72b, 72c, 72d, 72e, 72f are flanked by flanges 371c and 371d, 371e and 371f, 371g and 371h, 371i and 371j, 371k and 371m, respectively. Flail deformed portions 314, 318 of a first flail 310 may be placed in the recess channels 72a and 72d in an upstanding manner such that the second deformed portion 316 is disposed in a space 372. Deformed portions 314, 318 of other alternative flails 310 are similarly disposed in opposed recess channels 72b and 72e, 72c and 72f such that the deformed portions 316 of the remaining flails overlie the deformed portion 316 of the first alternative flail 310 in the space 372. The pairs of flanges 371a–371m disposed on either side of each of the recess channels 72a–72f are adapted to be deformed into contact with one another (for example, by melting of the plastic material) to form six bridge members 373a–373f (FIGS. 31 and 32) that permanently cover the length of each first and third deformed portion 314 and 318 of the flails 310. In order to maintain the strength of the flails 310, it is important to avoid melting the material of the flails 310 when forming the bridge members 373a–373f.

The first, second and third deformed portions 314, 316 and 318 prevent the flail 310 from moving axially (i.e., lengthwise) after placement of the flail 310 into an opposed pair of recess channels 72a–72f. This is accomplished by the interference of the relatively wider undeformed flail cutting portions 312a and 312b with the outer edges of the respective recess channels 72a–72f, and the interference of the relatively wider second deformed portion 316 with the inner edges of the recess channels 72a–72f.

It should be noted that the second deformed portion 316 is optional, as an undeformed portion disposed between the first and third deformed portions 314 and 318 and wider than the channels 72a–72f could provide the desired interference. However, the second deformed portion 316 is advantageous as it is substantially wider than the channels 72a–72d to minimize the chance of the flail 310 being pulled out of the head 64. Also, the second deformed portion 316 minimizes the vertical space taken up by the stacking of the flails 310 in the space 372.

If desired the flail assembly 90 of the first embodiment described above may instead be retained in the head 64 of FIGS. 24, 25, 31 and 32 by placing the carrier 92 of FIG. 15 in the space 372 and extending the flails 90a–90f through the channels 72a–72f prior to deformation of the upraised flanges 371a–371m. In this case, the entire head 64 is replaced when the flails 90a–90f are worn.

The present invention is advantageous in that the flail assembly 90 or the head 64, when worn, can be easily removed and replaced with a new one. This replacement procedure is simple and does not require the user to necessarily invert the string trimmer to remove the head. Instead, the user need only press the button 102 or 150, allowing the head 64 to simply fall off of the hub member. Similarly, for the head 200 (FIGS. 21–33), the user need only press the ears 222, 223 downwardly to release the head 64 from the auxiliary hub member 212. The disposable elements (i.e., the flail assembly 90 and the head 64) are manufactured of inexpensive components and replacement thereof can be accomplished in a short period of time. Disadvantages associated with the use of flail feeding mechanisms are not encountered, and hence consumer satisfaction is enhanced. This is particularly important, keeping in mind that the single greatest reason for return of string trimmers to the manufacturer is tangled flails in the flail feeding mechanism.

If desired, the flail assemblies 90, flails 310 and/or the head 64 can be color-coded as an indication to the consumer of comparability with one another or as an indication to the consumer of compatability with a particular model of string trimmer or a group of models of string trimmers.

In addition to the foregoing, cutting efficiency over the entire life of the flails may be improved as compared with other designs which utilize either a single flail or a plurality of flails, all of the same length.

Numerous modifications to the present invention will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights of all modifications which come within the scope of the appended claims are reserved.

What is claimed is:

1. A head assembly for a string trimmer, comprising:
    a hub member rotatable about an axis;
    a head adapted to be attached to the hub member for rotation therewith;
    at least one flail secured to the head;
    the flail comprising at least one first portion having a first cross-sectional geometry and at least one second portion having a second cross-sectional geometry;
    the head comprising a flail holding portion; and
    said at least one second portion of the flail is adapted to engage the flail holding portion for securing the flail assembly to the head, wherein the flail holding portion includes at least one recess channel having a width that is narrower than the first portion of the flail and the second portion of the flail comprises a flattened length of the flail that fits within the recess channel.

2. The head assembly of claim 1, wherein the head further includes at least one flange adapted to cover the flattened length of the flail within the recess channel.

3. The head assembly of claim 2, wherein said at least one flange is made from plastic material and is adapted to be melted to form a bridge member that permanently covers the flattened length of the flail within the recess channel.

4. The head assembly of claim 2, wherein said at least one flange comprises two flanges made from plastic material that are adapted to be melted together to form a bridge member that permanently covers the flattened length of the flail within the recess channel.

5. The head assembly of claim 1, wherein the head includes at least one recess channel having a width that is narrower than the first portion of the flail and the second portion of the flail comprises a flattened length of the flail that fits within the recess channel, thereby substantially preventing the flail from moving along its length with respect to the head.

6. The head assembly of claim 1, wherein the head includes a first recess channel and a second recess channel and said at least one second portion comprises two second portions, each adapted to fit within the first recess channel and the second recess channel, respectively.

7. The head assembly of claim 6, wherein the first recess channel and the second recess channel are diametrically opposed to one another.

8. A method of anchoring a flail to a head assembly of a string trimmer, the method comprising the steps of:
    providing a flail made from a length of string made from a polymer material, the length of string including at least one first portion having a first cross-sectional geometry and at least one second portion having a second cross-sectional geometry;
    providing a head assembly, the head assembly including at least one recess channel having a width that is narrower than the first portion of the flail; and
    inserting the second portion of the flail into the recess channel.

9. The method of claim 8, wherein the head assembly further includes at least one flange adapted to cover the second portion of the flail within the recess channel and the method further includes a step of covering the second portion of the flail within the recess channel with the flange.

10. A method for anchoring a flail to a head assembly of a string trimmer, the method comprising the steps of:
    providing a flail made from a length of string made from a polymer material and having a nominal width;
    forming at least one deformed portion on the length of string, the deformed portion having a width that is smaller than the nominal width;
    providing a head assembly, the head assembly including at least one recess channel having a width that differs from the nominal width of the flail; and
    inserting the deformed portion of the flail into the recess channel.

11. The method of claim 10, wherein the head assembly further includes at least one flange adapted to cover the deformed portion of the flail within the recess channel and the method further includes a step of covering the deformed portion of the flail within the recess channel with the flange.

12. The method of claim 11, wherein the covering step comprises a step of melting at least a portion of the flange.

13. The method of claim 10, wherein the forming step is a cold-working crimping operation to form the deformed portion of the flail.

* * * * *